US009477085B2

(12) United States Patent
Kim et al.

(10) Patent No.: US 9,477,085 B2
(45) Date of Patent: Oct. 25, 2016

(54) HEAD-MOUNTED DISPLAY AND METHOD OF CONTROLLING THE SAME

(71) Applicant: LG ELECTRONICS INC., Seoul (KR)

(72) Inventors: Jihwan Kim, Seoul (KR); Jongho Kim, Seoul (KR); Sinae Chun, Seoul (KR); Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 309 days.

(21) Appl. No.: 14/152,606

(22) Filed: Jan. 10, 2014

(65) Prior Publication Data

US 2015/0084850 A1 Mar. 26, 2015

(30) Foreign Application Priority Data

Sep. 26, 2013 (KR) ........................ 10-2013-0114535

(51) Int. Cl.
G02B 27/01 (2006.01)
G02B 27/64 (2006.01)
G02B 27/00 (2006.01)
G06F 1/16 (2006.01)
G06F 3/0346 (2013.01)

(52) U.S. Cl.
CPC ....... G02B 27/0172 (2013.01); G02B 27/0093 (2013.01); G02B 27/644 (2013.01); G06F 1/163 (2013.01); G06F 1/1694 (2013.01); G06F 3/0346 (2013.01); *G02B 2027/014* (2013.01); *G02B 2027/0138* (2013.01)

(58) Field of Classification Search
CPC ..... G02B 27/01; G02B 27/017; G06F 3/011; G06F 3/012; G06F 1/163; G06F 1/1694; G06F 3/0346; G02G 27/0172; G02G 27/0093; G02G 27/644

USPC .......................................................... 345/156
See application file for complete search history.

(56) References Cited

U.S. PATENT DOCUMENTS

| | | | | |
|---|---|---|---|---|
| 5,841,409 A | * | 11/1998 | Ishibashi | G02B 27/017 345/7 |
| 5,841,889 A | * | 11/1998 | Seyed-Bolorforosh | G01S 7/52046 382/128 |
| 6,011,526 A | * | 1/2000 | Toyoshima | G06F 3/012 345/156 |
| 7,176,960 B1 | * | 2/2007 | Nayar | G06T 3/4038 348/207.99 |
| 8,350,897 B2 | * | 1/2013 | Endo | G06F 3/011 345/633 |
| 2008/0159653 A1 | * | 7/2008 | Dunki-Jacobs | A61B 1/04 382/293 |
| 2009/0040308 A1 | * | 2/2009 | Temovskiy | F41G 3/16 348/158 |
| 2012/0052946 A1 | * | 3/2012 | Yun | A63B 69/004 463/32 |
| 2012/0256961 A1 | * | 10/2012 | Ogasawara | A63F 13/06 345/659 |
| 2012/0306725 A1 | | 12/2012 | Hilkes | |
| 2014/0081659 A1 | * | 3/2014 | Nawana | A61B 19/50 705/3 |

FOREIGN PATENT DOCUMENTS

| | | |
|---|---|---|
| JP | 3314324 B2 | 8/2002 |
| JP | 2007-333929 A | 12/2007 |
| JP | 2012-160898 A | 8/2012 |
| KR | 10-0686310 B1 | 2/2007 |

* cited by examiner

Primary Examiner — Fred Tzeng
(74) Attorney, Agent, or Firm — Birch, Stewart, Kolasch & Birch, LLP

(57) ABSTRACT

Disclosed herein are a head-mounted display and a method of controlling the same, more particularly, a method of performing rotation compensation on a captured image based on an angle of rotating a user wearing the head-mounted display and an angle of rotating a camera detached from the head-mounted display.

20 Claims, 15 Drawing Sheets

(a)

(b)

HEAD-MOUNTED DISPLAY AND METHOD OF CONTROLLING THE SAME

This application claims the benefit of the Korean Patent Application No. 10-2013-0114535, filed on Sep. 26, 2013, which is hereby incorporated by reference as if fully set forth herein.

BACKGROUND OF THE INVENTION

1. Field of the Invention

This specification relates to a head-mounted display and a method of controlling the same, more particularly, to a method of performing rotation compensation on a captured image based on an angle of rotating a user wearing the head-mounted display and an angle of rotating a camera detached from the head-mounted display.

2. Discussion of the Related Art

Head-mounted displays (HMDs) refer to various types of digital devices worn on the head like glasses to receive multimedia content provided. According to the current trend of ever lighter weight and more compact digital devices, various wearable computers are under development, and HMDs are also widely used. HMDs may provide a variety of conveniences to users beyond a simple function of display by being combined with the augmented reality technology and the N-Screen technology.

For example, in the case that an HMD is equipped with a microphone and a speaker, a user can make a phone call, wearing the HMD. In addition, in the case that the HMD is equipped with a camera, the user can capture an image of an object in a desired direction, wearing the HMD.

SUMMARY OF THE INVENTION

Accordingly, this specification is directed to a head-mounted display and a method of controlling the same that substantially obviate one or more problems due to limitations and disadvantages of the related art.

An object of this specification is to acquire an angle of rotating a head-mounted display (HMD) and an angle of rotating a camera and provide an image performed by rotation compensation on an image sensed through the camera of the HMD based on the angle of rotating the HMD and the angle of rotating the camera in the case that the camera is detached from the HMD.

Another object of this specification is to acquire an angle of rotating an HMD and an angle of rotating a camera and provide an image performed by rotation compensation on an image sensed through the camera of the HMD based on the angle of rotating the HMD or the angle of rotating the camera in the case that the camera is mounted to the HMD.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head-mounted display (HMD) includes a first body and a second body, wherein the first body includes a display unit configured to display visual information, a first angle sensing unit configured to sense a first angle of rotating the first body, a first communication unit configured to transmit/receive data, and a processor configured to control the display unit, the first angle sensing unit, and the first communication unit, and the second body includes a camera unit configured to sense an image, a second communication unit configured to transmit/receive data, an input sensing unit configured to detect an input signal and transmit a result of the detection to the processor, and a second angle sensing unit to sense a second angle of rotating the second body, wherein the second body is mountable to and detachable from the first body, wherein, when the second body is detached from the first body, the processor is further configured to: acquire the first angle of rotation and the second angle of rotation, display a separation image preview interface to display an image performed by a first rotation compensation on a sensed image based on the second angle of rotation, detect a first capturing signal, and captures the sensed image and store an image performed by a second rotation compensation on the captured image based on the first angle of rotation and the second angle of rotation.

In another aspect of the present invention, a method of controlling a head-mounted display including a first body and a second body, includes, in the case that the second body is detached from the first body, the steps of acquiring a first angle of rotation and a second angle of rotation, wherein the first angel of rotation is an angle of rotating the first body, and the second angle of rotation is an angle of rotating the second body, displaying an separation image preview interface to display an image performed by a first rotation compensation on a sensed image according to the second angle of rotation, detecting a first capturing signal, and capturing the sensed image and storing an image performed by a second rotation compensation on the captured image according to the first angle of rotation and the second angle of rotation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although the terms used in this specification have been selected, as much as possible, from general terms that are widely used at present while taking into consideration of the functions obtained in accordance with one embodiment, these terms may be replaced by other terms based on intentions of those skilled in the art, customs, emergence of new technologies, or the like. In addition, in a particular case, terms that are arbitrarily selected by the applicant may be used. In this case, meanings of these terms may be disclosed in corresponding description parts of the invention. Accordingly, it should be noted that the terms used herein should be construed based on practical meanings thereof and the whole content of this specification, rather than being simply construed based on names of the terms.

Embodiments will now be described in detail with reference to the accompanying drawings and the content disclosed therein. However, this specification is not limited to or constrained by the embodiments. Wherever possible, the same reference numbers will be used throughout the drawings to refer to the same or like parts.

Figure 1:
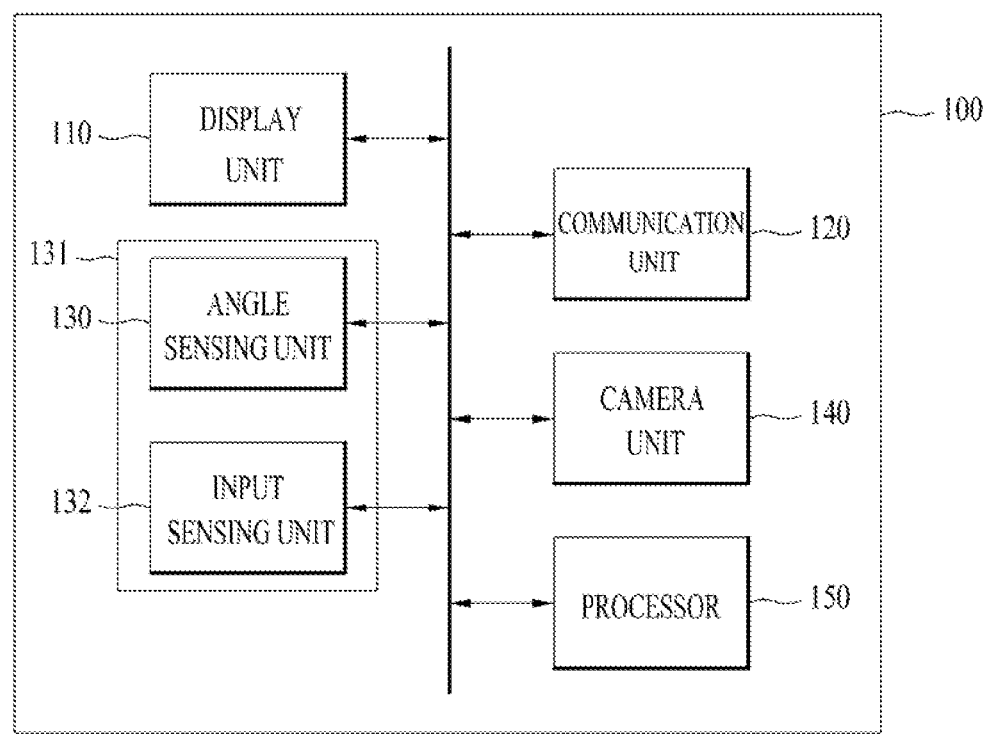
FIG. 1 is a block diagram illustrating a head-mounted display (HMD) disclosed in this specification.

FIG. 1 is a block diagram illustrating a head-mounted display (HMD) disclosed in this specification. In FIG. 1 illustrating one embodiment, some constituent modules may be omitted, or new constituent modules may be added by a person skilled in the art, as desired.

As shown in FIG. 1, the HMD 100 according to one embodiment may include a display unit 110, a communication unit 120, a sensing unit 130, a camera unit 140 and a processor 150.

The HMD 100 may include a first body and a second body. The first body, which serves as a main body of the HMD 100, may include the display unit 110, a first communication unit, a first angle sensing unit, and the processor 150. The second body, which is separable from the main body of the HMD 100, may include a second angle sensing unit, the camera unit 140, and a second communication unit. The aforementioned first body and second body are one embodiment, and some constituent units of the first body and second body may be changed or new constituent units may be added to the first body and second body, as desired by a person skilled in the art. Details of the first body and second body will be described with reference to FIG. 2.

The display unit 110 may display visual information. Herein, the visual information may include content, an application, an image, and a video. In addition, the display unit 110 may output the visual information to the screen based on a control command from the processor 150. In this specification, the display unit 110 may be included in the first body of the HMD 100.

In this specification, the HMD 100 may output an image to the display screen in various techniques. In one embodiment, the HMD 100 may output an image with a see-through technique. Herein, the see-through technique, which employs a transparent display screen, represents a technique allowing a user wearing the HMD 100 to use content while recognizing the surrounding environment. In another embodiment, the HMD 100 may output an image with a front-light technique. Herein, the front-light technique represents a technique of displaying a reflected image using a reflector such as a mirror without directly projecting light into the eyes.

Also, in another embodiment, the HMD 100 may output an image with a see-closed technique. Herein, the see-closed technique represents a technique of using content through the display screen while an external environment is not visible through the display screen. In this specification, the HMD 100 is assumed to display an image using the see-through or front-light technique.

The communication unit 120 may communicate with an external device and transmit/receive data using various protocols. In addition, the communication unit 120 may access a network in a wired or wireless manner to transmit/receive digital data such as content. For example, the communication unit may use communication standards such as wireless LAN (WLAN or Wi-Fi), wireless broadband (WiBro), world interoperability for microwave access (Wi-Max), and high speed downlink packet access (HSDPA) to access a wireless network.

In this specification, the communication unit 120 may include a first communication unit and a second communication unit. As described above, the first communication unit may be provided to the first body, and the second communication unit may be provided to the second body. For example, the first communication unit and second communication unit may transmit/receive a signal to/from the processor 150 included in the first body, and may transmit/receive a signal to/from the camera unit 140 included in the second body.

The sensing unit 130 may sense a surrounding environment of the HMD 100 using at least one sensor mounted to the HMD 100, and deliver a signal for the same to the processor 150.

The sensing unit 130 may include at least one sensing means. According to one embodiment, the at least one sensing means may include a gravity sensor, a geomagnetic sensor, a motion sensor, a gyroscope sensor, an acceleration sensor, an infrared sensor, an inclination sensor, an illuminance sensor, an altitude sensor, an olfactory sensor, a temperature sensor, a depth sensor, a pressure sensor, a bending sensor, an audio sensor, a video sensor, a global positioning system (GPS) sensor, a touch sensor and a grip sensor.

In addition, the sensing unit 130, which a general term for the various sensing means described above, may sense various inputs from the user and the environment of the HMD 100 and deliver a result of sensing to the processor 150 such that the processor 150 can perform an operation corresponding to the sensed inputs and environment. The aforementioned sensors may be included in the HMD 100 as separate elements or by being integrated into at least one element.

In this specification, the sensing unit 130 may include an angle sensing unit 131 and an input sensing unit 132. The angle sensing unit 131 and the input sensing unit 132 may be provided to each of the first body and the second body. For example, the angle sensing unit provided to the first body may sense the angle of rotating the first body, and the input sensing unit provided to the first body may detect an input signal to the first body from the user. In addition, the angle sensing unit provided to the second body may sense the angle of rotating the second body, and the input sensing unit provided to the second body may detect an input signal to the second body from the user. In addition, a signal for detachment of the first body and the second body and a signal for mounting of the second body to the first body may be detected through various sensing means provided to the first body and the second body. In addition, an image capturing signal may be detected through the input sensing unit provided to the first body or the second body.

The camera unit 140 may capture an image. More specifically, the camera unit 140 may capture an image of an object in the front. Herein, the front may correspond to the direction in which the camera unit 140 faces. In addition, the camera unit 140 may sense an image within the range of angle of view, and provide the same to the processor 150. Herein, the range of angle of view refers to the range of horizontal and vertical viewing angles that may be covered by the screen in sensing an image.

In this specification, the camera unit 140 may be included in the second body. In this specification, the camera unit 140 may be provided not only to the second body but also to the first body. The camera unit 140 included in the second body may sense an image while being mounted to the first body. In addition, the camera unit 140 included in the second body may sense an image while being detached from the first body.

The processor 150 may process data, control the respective units of the HMD 100 described above, and control transmission/reception of data between the units. In this specification, the processor 150 may be included in the first body. For example, the processor 150 may control not only the display unit 110, the first angle sensing unit and the first communication unit included in the first body, but also the camera unit 140, the second communication unit, the sensing unit 130 and the second angle sensing unit included in the second body. The processor 150 may be separately provided to the second body in addition to the first body.

In this specification, in the case that the second body is detached from the first body, the processor 150 may acquire a first angle of rotation and a second angle of rotation. In addition, the processor 150 may display a separation image preview interface to display an image performed by a first rotation compensation on an sensed image based on the second angle of rotation. In addition, the processor 150 may detect a first capturing signal. In addition, the processor 150 may capture the sensed image, and store an image performed by a second rotation compensation on the captured image based on the first angle of rotation and the second angle of rotation. Operations of the processor 150 will be described in detail with reference to FIGS. 3 to 7.

According to one embodiment of this specification, the operations performed by the HMD 100 may be controlled the processor 150. In the following descriptions and drawings, theses operations will commonly described as being performed/controlled by the HMD 100, for ease of description.

Although not shown in FIG. 1, the HMD 100 may include a power unit, storage unit, audio unit. The power unit is a power source connected to the internal battery of the HMD 100 or an external power source. The power unit may supply power to the HMD 100. In addition, the storage unit may store various digital data including audio data, photos, videos and applications. The storage unit may represent various digital data storage spaces including a flash memory, a random access memory (RAM), and a solid state drive (SSD). In addition, the audio unit may output receive or output audio data through the microphone and the speaker.

FIG. 1 is a block diagram of the HMD 100 according to one embodiment. The individually indicated blocks show elements of the HMD 100 which are logically distinguished from each other. Accordingly, the illustrated elements of the HMD 100 may be mounted to one chip or a plurality of chips according to the design of the device.

Figure 2:
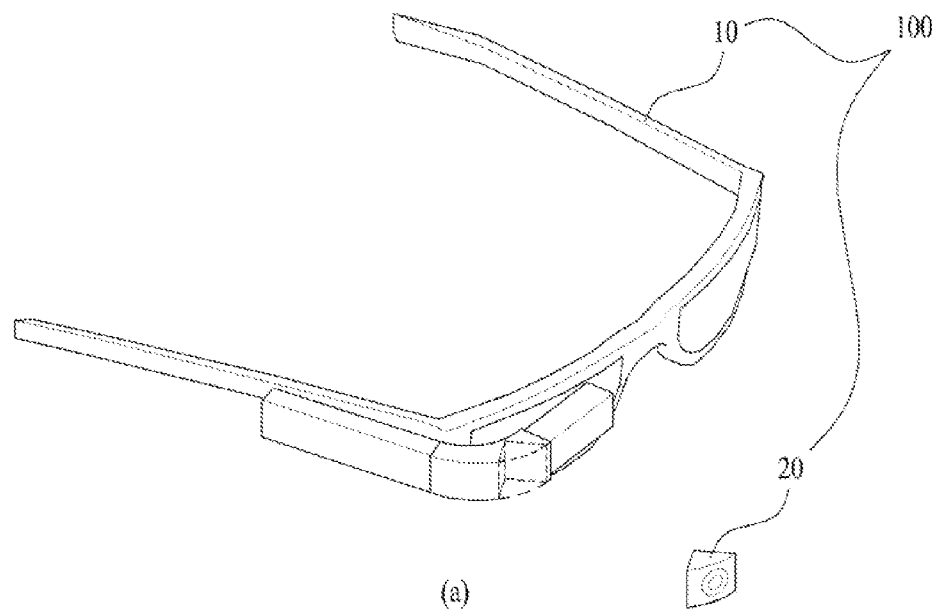
FIG. 2 is a view illustrating an embodiment of the HMD of this specification.
Figure 2:
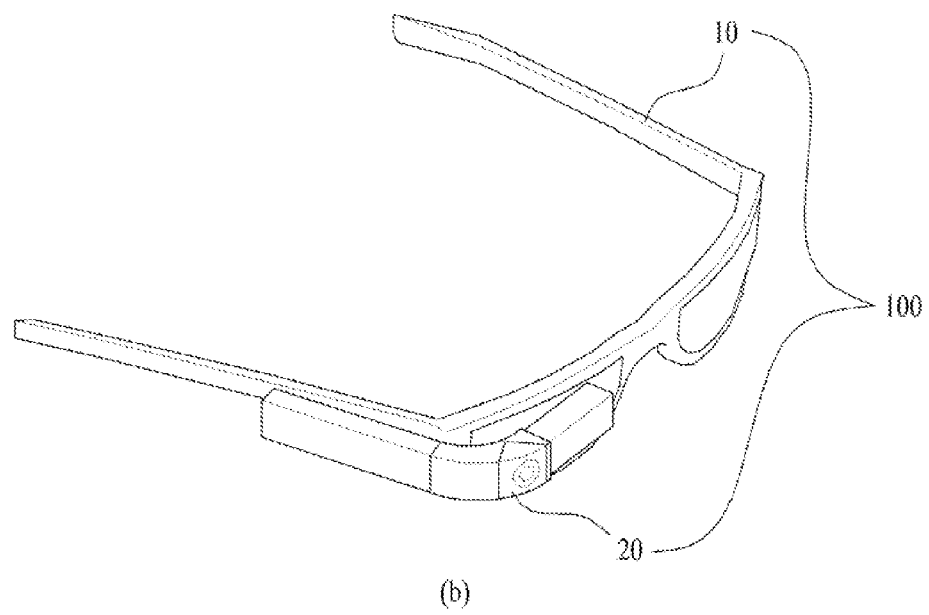

FIG. 2 is a view illustrating an embodiment of the HMD of this specification. More specifically, FIG. 2(*a*) illustrates the HMD 100 with the second body 20 detached from the first body 10. FIG. 2(*b*) illustrates the HMD 100 with the second body 20 mounted to the first body.

As described above with reference to FIG. 1, the HMD 100 may include the first body 10 and the second body 20. In addition, the first body 10 may correspond to the main body of the HMD 100, and the second body 20 may correspond to a sub-body of the HMD 100.

In this specification, the first body 10 may be provided with a display unit, a first communication unit, a first sensing unit and a processor. The first body 10 may be additionally provided with a camera unit. In this specification, the second body 20 may be provided with a camera unit, a second communication unit, and a second sensing unit. The second body 20 may be additionally provided with a processor operating independently of the processor of the first body 10.

In addition, as shown in FIG. 2, the second body 20 may be detached from and mounted to the first body 10. Thereby, the camera unit included in the second body 20 may sense an image at various angles when detached from or mounted to the first body 10. The second body may be detached from and mounted to the first body 10 in various ways. For example, a portion of the first body 10 or the second body 20 that is detached and mounted may be provided with a magnetic part to allow the second body 20 to be detached from and mounted to the first body. In addition, a portion of the first body 10 or the second body 20 that is detached and mounted may be configured with a connection structure to facilitate detachment and mounting.

FIG. 3 is a view illustrating rotation compensation of the second body of the HMD of this specification. More specifically, FIG. 3*a* illustrates rotating the second body 20, and FIG. 3*b* illustrates rotation compensation according to rotating the second body 20.

Figure 3A:
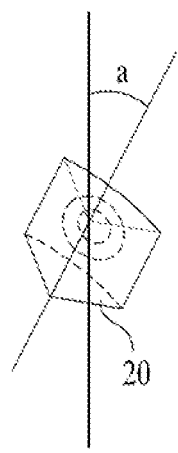
FIGS. 3a and 3b are views illustrating rotation compensation for a second body of the HMD of this specification.

Referring to FIG. 3*a*, when the second body 20 is detached from the first body, the second body 20 may remain rotated angle a clockwise. In this case, an image sensor 21 of the camera unit included in the second body 20 may remain rotated angle a clockwise, as shown in the first figure of FIG. 3*b*. Accordingly, the HMD 100 may sense, through the camera unit, an image rotated angle a clockwise with respect to the horizontal position of the image sensor 21.

Figure 3B:
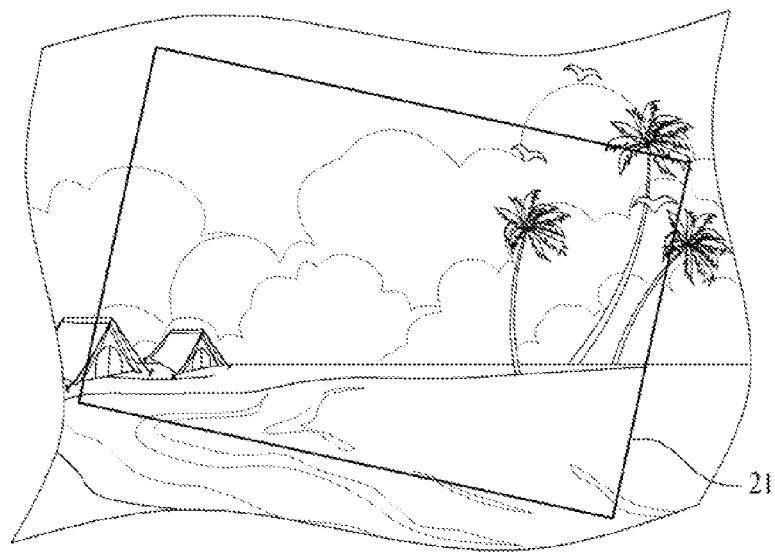
Figure 3B:
Figure 3B:
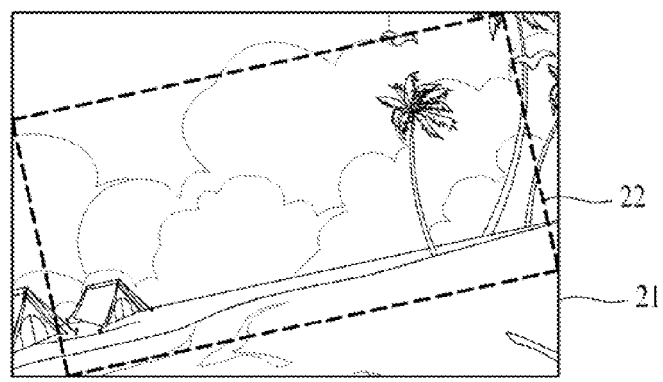
Figure 3B:
Figure 3B:
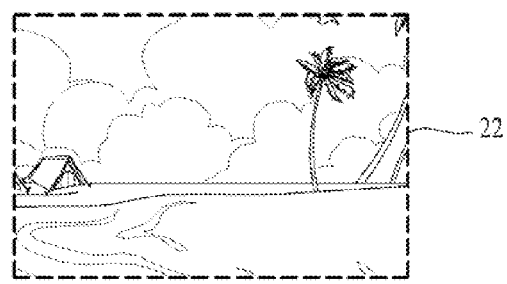

Thereby, the HMD 100 may acquire the sensed image 21 as shown in the second figure of FIG. 3*b*. In this case, since the horizontal line of the sensed image 21 is rotated angle –a, the HMD 100 may perform rotation compensation on the sensed image to obtain an image in a horizontal position. More specifically, the HMD 100 may perform rotation compensation of rotating the sensed image 21 by an amount of angle a clockwise. At this time, the HMD 100 may perform cropping 22 of the sensed image for leveling calibration based on the ratio of the frame of the camera unit. For example, the ratio of the frame of the camera unit may be 3:2. In addition, the image 22 having undergone rotation compensation and cropping may be an image performed by leveling compensation on the image sensed through the camera unit.

The aforementioned rotation compensation and cropping, which are performed in consideration of the angle of rotating the camera unit, may generally correspond to a method of performing rotation compensation of a camera. In this specification, rotation compensation will be assumed to be performed based on the angle of rotating the HMD 100 worn by the user as well as the angle of rotating the camera unit. Accordingly, performing rotation compensation of the first body with rotation compensation of the second body including the camera unit performed will be described with reference to FIG. 4.

Figure 4A:
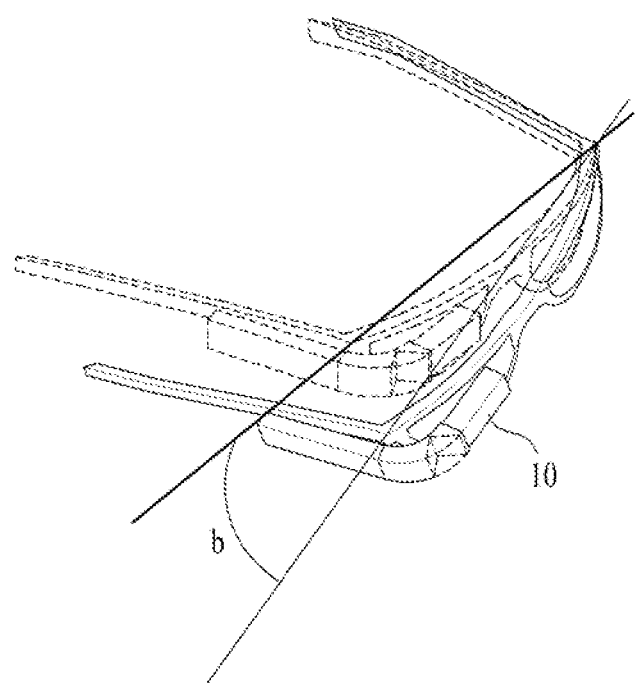
FIGS. 4a to 4c are views illustrating rotation compensation for a first body of the HMD of this specification.
Figure 4B:
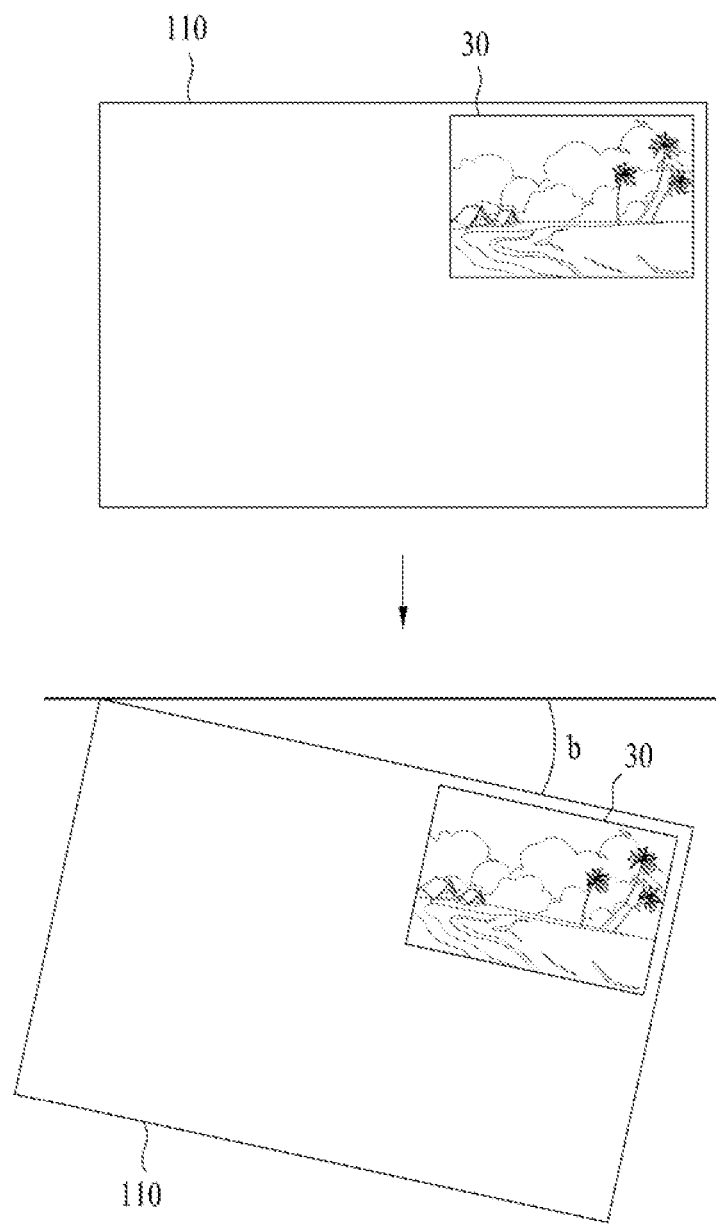
Figure 4C:
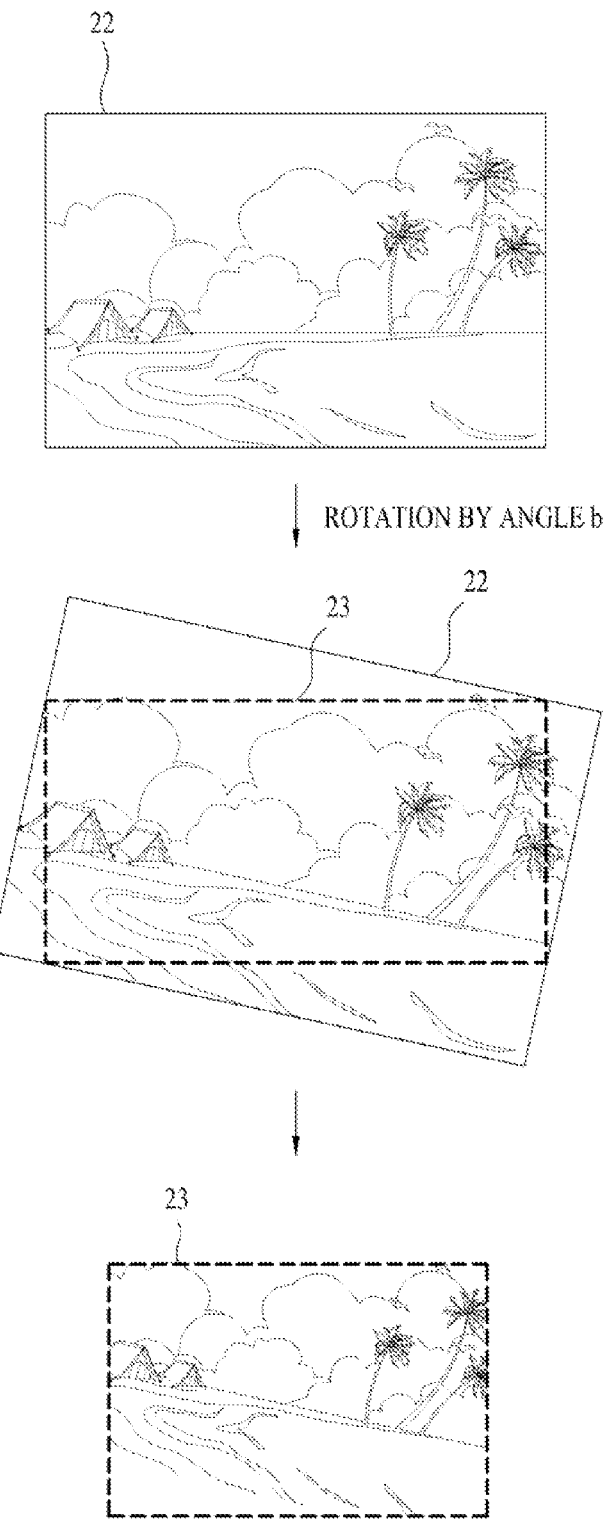

FIG. 4 is a view illustrating rotation compensation for the first body of the HMD of this specification. More specifically, FIG. 4a shows rotation of the first body 10, FIG. 4b shows an image displayed according to rotation of the first body 10, and FIG. 4c shows rotation compensation according to rotation of the first body 10.

When the user wearing the HMD 100 is in a horizontal position as shown in the first figure in FIG. 4b, the display unit 110 and the image preview interface 30 may be in a horizontal position. Herein, the image displayed on the image preview interface 30 corresponds to the image performed by rotation compensation and cropping on the image shown FIG. 3.

Meanwhile, the HMD 100 may remain rotated angle b clockwise, as shown in FIG. 4a. More specifically, the first body 10 of the HMD 100 worn by the user may remain rotated angle b clockwise regardless of the angle of rotating the second body.

In this case, the display unit 110 of the HMD 100 remains rotated angel b clockwise as shown in the second figure in FIG. 4b. In addition, the HMD 100 may rotate the image preview interface 30 angle b clockwise. Accordingly, the user may be provided with a horizontal image displayed on the image preview interface 30 even when the HMD 100 rotates.

At this time, the HMD 100 may detect an image capturing signal. In this case, as shown in FIG. 4c, the HMD 100 may capture the image 22 displayed on the image preview interface 30 with the image rotated angle b clockwise. That is, the captured image 23 may correspond to an image rotated angle b clockwise. More specifically, the captured image 23 corresponds to an image having rotated angle b clockwise and cropped according to the ratio of the frame. Thereby, capturing and storing of an image inclined according to movement of the HMD worn by the user with an angle of rotation may be implemented.

Figure 5:
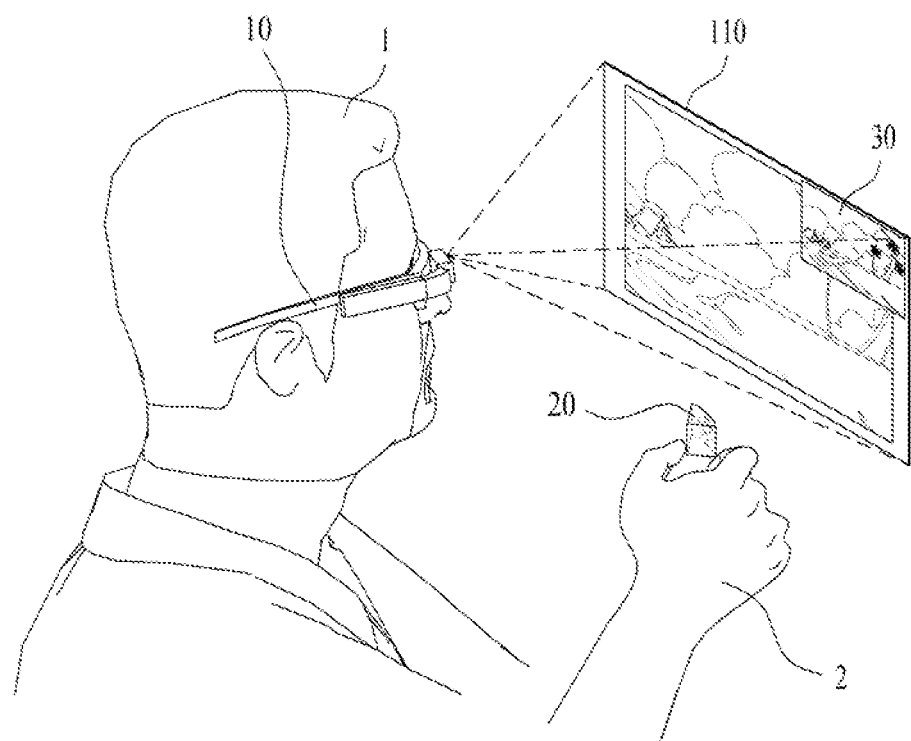
FIG. 5 is a view illustrating a method of controlling the HMD of this specification.

FIG. 5 is a view illustrating a method of controlling the HMD of this specification. More specifically, FIG. 5 illustrates capturing an image using the second body 20 detached from the first body 10 of the HMD 100.

In the case that the second body 20 is detached from the first body 10, the HMD 100 may activate a camera interface. That is, when the HMD 100 detects a signal for detachment of the second body 20 from the first body 10, it may execute the camera application. Activation of the camera interface may be implemented in various ways.

Once the camera interface is activated, the HMD 100 may display the image preview interface 30 on the display unit 110. The image preview interface 30 may display an image sensed through the camera unit included in the second body 20. In FIG. 5, since the camera unit is in the horizontal position, the HMD 100 may display a horizontal image sensed through the camera unit on the image preview interface 30. Herein, the horizontal image refers to an image a line such as the horizontal line or the horizon indicating the leveling is maintained in the horizontal position.

In addition, in the case that the HMD 100 is a see-through HMD, not only the image preview interface 30 but also an external environment seen in the eyes of the user 1 may be displayed on the display unit 110. Meanwhile, in the case that the angle of view of the camera unit is wider than the angle of view of the eyes of the user 1, an image having a wider angle of view than the external environment seen through the eyes may be displayed on the image preview interface 30 as shown in FIG. 5.

In the embodiment illustrated in FIG. 5, the user 1 may capture an image displayed on the image preview interface 30, holding the second body 20. In this case, the first body 10 and the second body 20 are in the horizontal position, and therefore rotation compensation may not need to be performed on the captured image. In the case that the user 1 tilts the second body 20 leftward or rightward, or the first body 10 worn by the user 1 tilts leftward or rightward in contrast with the embodiment of FIG. 5, rotation compensation needs to be performed on the sensed image, which will be described with reference to FIG. 6.

Hereinafter, an embodiment of capturing an image based on both the angle of rotating the camera and the angle of rotating the HMD 100 will be described with reference to FIGS. 6 and 7. In this embodiment, a different image is stored depending upon whether the camera is detached or mounted.

FIG. 6 is a view illustrating a first rotation compensation and a second rotation compensation performed in the case that the second body of the HMD of this specification is detached from the first body of the HMD.

Figure 6A:
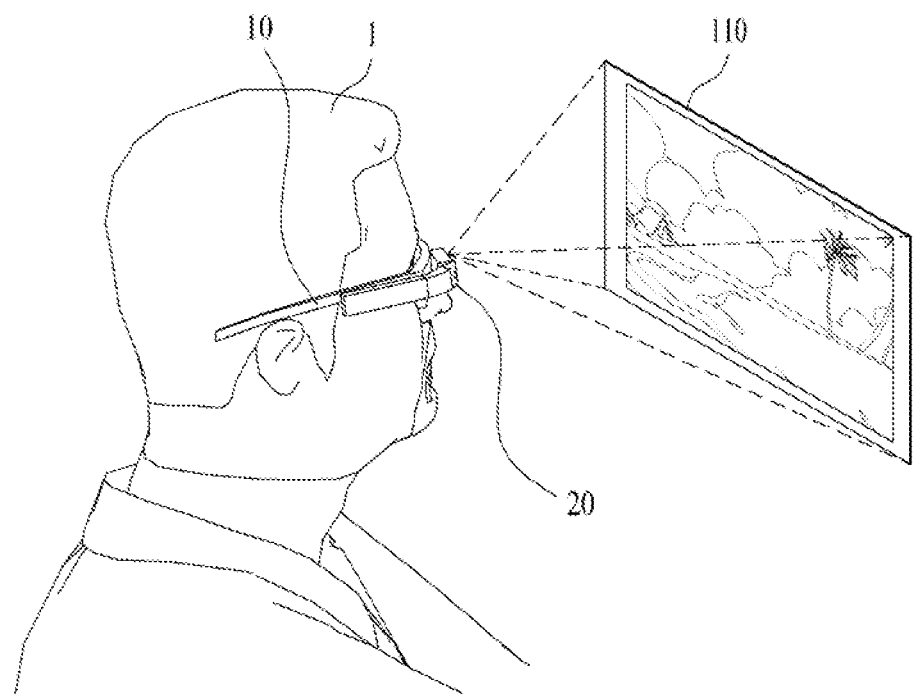
FIGS. 6a to 6c are views illustrating a first rotation compensation and a second rotation compensation in the case that the second body of the HMD is detached from the first body of the HMD of this specification.
Figure 6B:
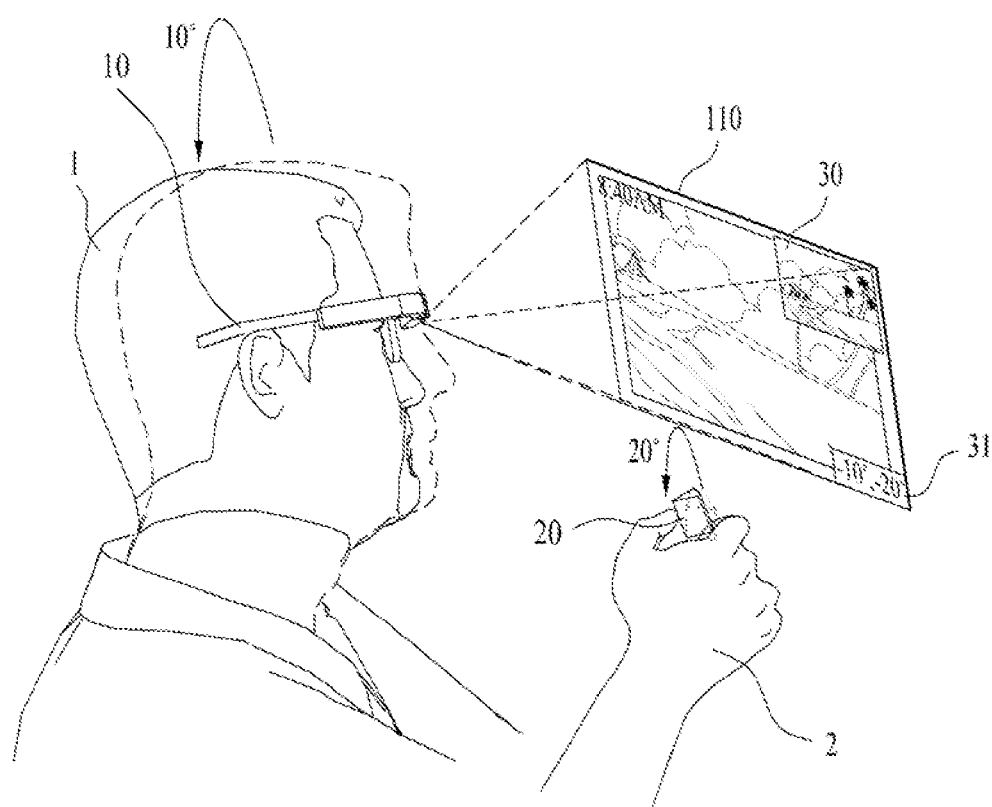
Figure 6C:
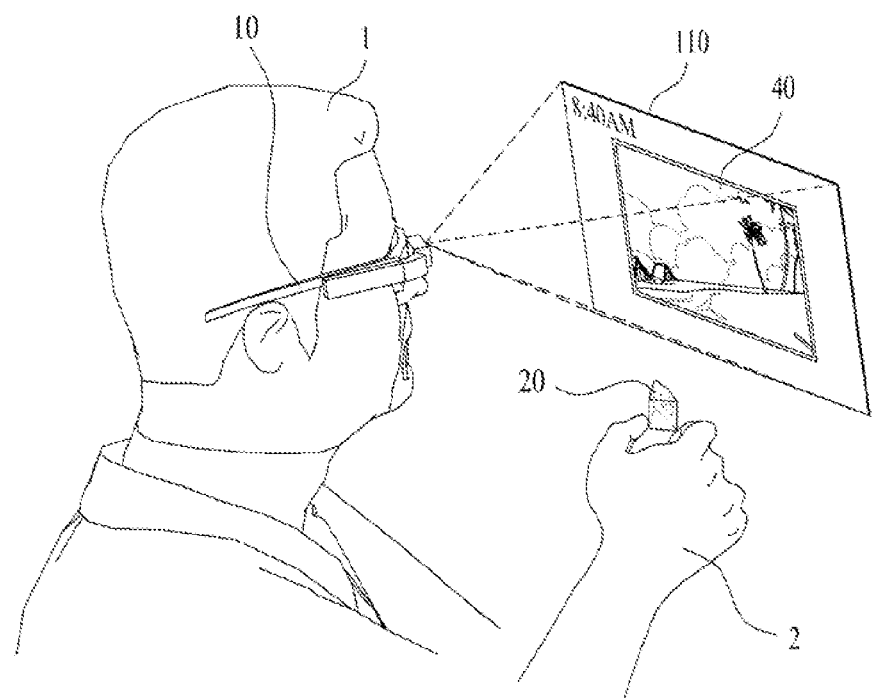

More specifically, FIG. 6a illustrates the case in which the second body 20 is mounted to the first body 10, FIG. 6b illustrates capturing an image according to rotating the first body 10 and the second body 20 with the second body 20 detached from the first body 10, and FIG. 6c illustrates a review interface 40 displaying a captured image.

Referring to FIG. 6a, the HMD 100 may face forward with the second body 20 mounted to the first body 10. That is, FIG. 6a corresponds to the case in which the user 1 faces forward, wearing the HMD 100. In addition, FIG. 6a may correspond to the case in which the HMD 100 is maintained in the horizontal position with the second body 20 mounted to the first body 10.

Referring to FIG. 6b, the HMD 100 may detect a signal for detachment of the second body 20 from the first body 10. The signal for detachment of the second body 20 from the first body 10 may be detected through a sensing unit provided to at least one of the first body 10 and the second body 20 when the first body 10 and the second body 20 are completely detached from each other. In addition, the HMD 100 may activate the camera interface based on the signal for detachment, as described above with respect to FIG. 5.

In addition, when the second body 20 is detached from the first body 10, the HMD 100 may acquire a first angle of rotation and a second angle of rotation. Herein, the first angle of rotation, which is the angle of rotating the first body 10, may be acquired through a first angle sensing unit provided to the first body 10. For example, in FIG. 6b, the first angle of rotation may be −10°. In addition, the second angle of rotation, which is the angle of rotating the second body 20, may be acquired through a second angle sensing unit provided to the second body 20. For example, in FIG. 6b, the second angle of rotation may be −20°. In the description of this specification given below, it will be assumed that a positive (+) angle is an angle rotated clockwise, a negative (−) angle is an angel rotated counterclockwise.

Next, the HMD 100 may display a separation image preview interface 30, which displays an image performed by the first rotation compensation on an image sensed through the camera unit based on the second angle of rotation. The separation image preview interface 30 corresponds to an interface that displays an image sensed through the camera unit on the display unit 110 in the case that the second body 20 is detached from the first body 10. For example, the separation image preview interface 30 may display the image sensed through the camera unit without changing the image, or may display an image performed by rotation compensation on the sensed image in the case that the image is sensed by the camera unit rotated an angle. In the embodiment illustrated in FIG. 6b, the HMD 100 may display, on the separation image preview interface 30, an image performed by rotation compensation on the image sensed through the camera unit. Herein, the rotation compensation is the first rotation compensation.

Meanwhile, the first rotation compensation represents rotating the sensed image by the amount of the second angle of rotation in the rotational direction of the second angle of rotation. That is, in FIG. 6b, when the camera unit is rotated −20°, the image sensed through the camera unit may be an image rotated +20° with respect to the horizontal position. Accordingly, an image obtained through the first rotation compensation corresponds to an image rotated by the sensed image −20°. In addition, as described above with reference to FIG. 4, the first rotation compensation may include rotating the sensed image −20° and cropping the image based on the ratio of the frame.

In addition, the HMD 100 may display the separation image preview interface 30 on one of the upper, lower, left and right sides of the display unit 110. In addition, the HMD 100 may display the separation image preview interface 30 on at least one part of the display unit 110. For example, as shown in FIG. 6b, the HMD 100 may display the separation image preview interface 30 on the upper right end of the display unit 110.

Meanwhile, the HMD 100 may display the separation image preview interface 30 and a display object on the display unit 110 simultaneously. As shown in FIG. 6b, the HMD 100 may display the image preview interface 30 on the upper right end of the display unit 110 and an display object of '8:40 AM' on the upper left end of the display unit 110. Thereby, the user 1 is allowed to perform a plurality of operations on the display unit 110.

In addition, although not shown in FIG. 6, the HMD 100 may display the separation image preview interface 30 and the detached-mode indicator (not shown) on the display unit 110 simultaneously. Herein, the detached-mode indicator (not shown) is an indicator to indicate that the second body 20 has been detached from the first body 10. Thereby, the user 1 may readily recognize separation of the second body 20 from the first body 10.

Next, by displaying an image performed by the first rotation compensation on the separation image preview interface 30, the HMD 100 may provide a horizontal image to the user 1 regardless of the angle of the HMD 100 worn by the user 1.

Next, the HMD 100 may detect a first capturing signal. Herein, the first capturing signal is a signal for capturing an image. For example, the first capturing signal may include a touch input to the first body 10 or the second body 20 and an audio input to the first body 10 or the second body 20. In FIG. 6b, the first capturing signal may correspond to a touch input to the second body 20 by a hand 2 of the user 1.

In addition, the HMD 100 may capture the sensed image based on the detected first capturing signal. More specifically, the HMD 100 may capture an image sensed by the camera unit based on the detected first capturing signal. For example, in FIG. 6b, since the camera unit is in a position rotated −20°, the captured image correspond to an image rotated +20° with respect to the horizontal line.

Next, the HMD 100 may store an image performed by the second rotation compensation on the captured image based on the first angle of rotation and second angle of rotation. Herein, the second rotation compensation represents compensation through rotating the captured image by the amount of the sum of the first angle of rotation and the second angle of rotation in the direction of the first angle of rotation or second angle of rotation. As described above, in FIG. 6b, the first angle of rotation is −10°, and the second angle of rotation is −20°. Accordingly, the second rotation compensation represents compensation through rotating the captured image by 30° in the negative direction, i.e., the counterclockwise direction.

As described above, the captured image corresponds to an image captured through the camera unit. For the camera in the position rotated −20°, the captured image corresponds to an image rotated +20°. Accordingly, since the image performed by the second rotation compensation is obtained by rotating the image rotated +20° by −30°, it may corresponds to an image rotated −10°. Accordingly, the stored image corresponds to an image rotated −10. Therefore, the HMD 100 may store an image rotated −10°, as shown in FIG. 6c.

Meanwhile, the HMD 100 may display the review interface 40 to display an image performed by the second rotation compensation. Referring to FIG. 6c, when a captured image is stored, the HMD 100 may display the review interface 40 to allow the user 1 to confirm the stored image. In this case, the HMD 100 may display the image performed by the second rotation compensation on the review interface 40 by zooming in the image. This serves to allow the user 1 to recognize the image, whose size is reduced through the rotation compensation and cropping.

In addition, the HMD 100 may display an indicator which indicates at least one of the first angle of rotation and the second angle of rotation. For example, as shown in FIG. 6b, the HMD 100 may display the first angle of rotation and the second angle of rotation in the form of, for example, '−10°, −20°'. In addition, the indicator indicating the angle of rotation is not limited to the example shown in FIG. 6b. The indicator may be displayed in various forms and ways.

Although not shown in FIG. 6, the first body 10 or the second body 20 configuring the HMD 100 may be in the horizontal position. In this case, the first rotation compensation and second rotation compensation may be performed differently than in the embodiment of FIG. 6.

In one embodiment, when the first body 10 is in the horizontal position, the first rotation compensation and second rotation compensation may correspond to the compensation through rotating a sensed image or captured image by the amount of the second angle of rotation in the rotational direction of the second angle of rotation. This is because the first angle of rotation is not considered in the case that the first body 10 is in the horizontal position.

In another embodiment, when the second body 20 in the horizontal position, the second rotation compensation may correspond to the compensation through rotating a captured image by the amount of the second angle of rotation in the rotational direction of the second angle of rotation. In this case, the second angle of rotation is 0°, the first rotation compensation may not need to be performed.

FIG. 7 is a view illustrating a first rotation compensation and a second rotation compensation in the case that the second body of the HMD is mounted to the first body of the HMD of this specification.

Figure 7A:
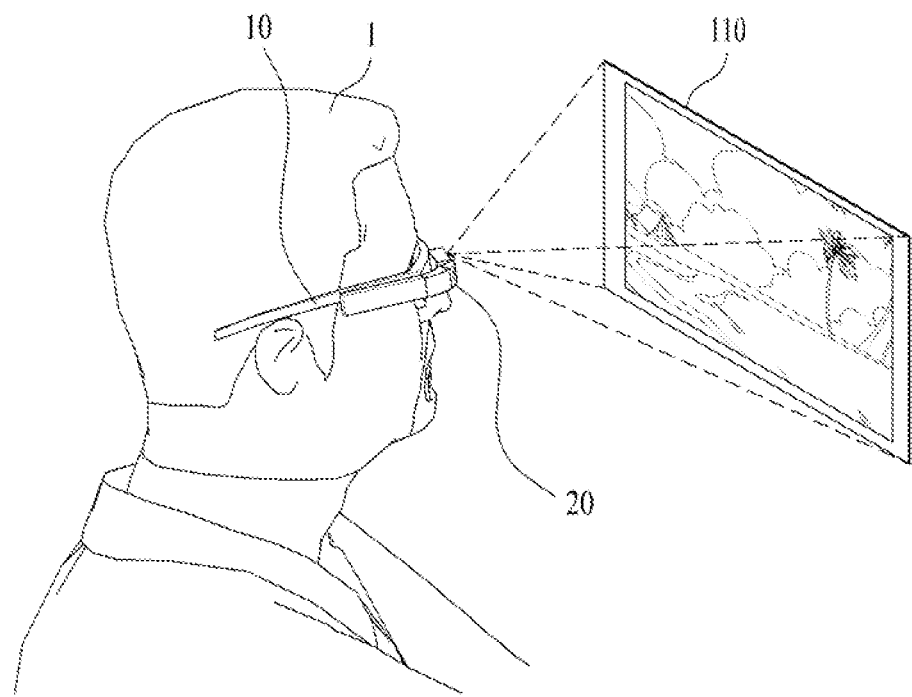
FIGS. 7a to 7c are views illustrating a first rotation compensation and a second rotation compensation in the case that the second body of the HMD is mounted to the first body of the HMD of this specification.
Figure 7B:
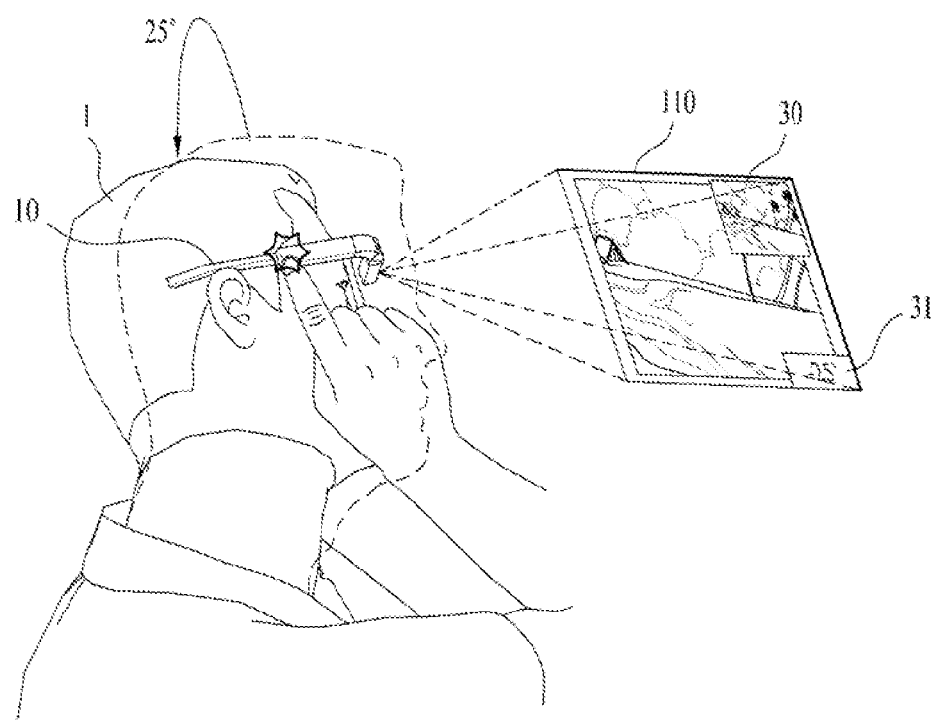
Figure 7C:
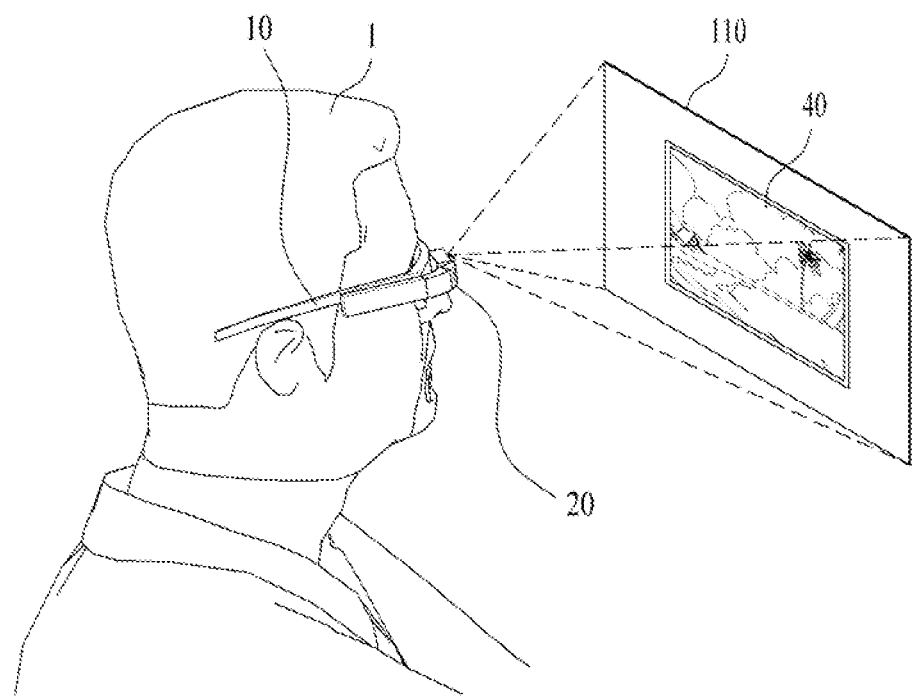

More specifically, FIG. 7a illustrates the second body 20 mounted to the first body 10, FIG. 7b illustrates capturing an image according to rotating the first body 10 and the second body 20 with the second body 20 mounted to the first body 10, and FIG. 7c illustrates the review interface 40 showing a captured image.

Referring to FIG. 7a, the HMD 100 may face forward with the second body 20 mounted to the first body 10. That is, FIG. 7a corresponds to the case in which the user 1 faces forward, wearing the HMD 100. Next, referring to FIG. 7b, the HMD 100 may activate the camera interface with the second body 20 mounted to the first body 10. In this regard, when a predetermined input signal is detected, the HMD 100 may activate the camera interface.

Next, the HMD 100 may display a mounting image preview interface 30 that displays an image sensed through the camera unit. The mounting image preview interface 30 corresponds to an interface that displays an image sensed through the camera unit on the display unit 110 without changing the sensed image, in the case that the second body 20 is mounted to the first body 10. In the embodiment of FIG. 7b, the HMD 100 may display an image sensed through the camera unit on the mounting image preview interface 30 without changing the sensed image. Unlike the embodiment of FIG. 6, the second body 20 including the camera unit is mounted to the first body 10, and therefore the angle of rotating the image sensed by the camera unit is equal to the angle of rotation felt by the user 1 wearing the HMD 100.

Although not shown in FIG. 7b, the HMD 100 may display the mounting image preview interface 30 and a mounted-mode indicator simultaneously. Thereby, the user 1 may recognize that the second body 20 is sensing an image while being mounted to the first body 10.

Next, the HMD 100 may detect a second capturing signal. Herein, the second capturing signal corresponds to a signal for capturing an image. For example, the second capturing signal may include a touch input to the first body 10 or the second body 20 and an audio input to the first body 10 or the second body 20. In FIG. 7b, the second capturing signal may correspond to a touch input to the first body 20 by the hand 2 of the user 1.

In addition, the HMD 100 may capture the sensed image based on the detected second capturing signal. More specifically, the HMD 100 may capture an image rotated −20° based on the detected second capturing signal.

Next, the HMD 100 may acquire a first angle of rotation and a second angle of rotation based on the detected second capturing signal. Herein, the first angle of rotation corresponds to the angle of rotating the first body 10. For example, in FIG. 7b, the first angle of rotation may be −25°. The second angle of rotation corresponds to the angle of rotating the second body 20. For example, in FIG. 7b, the second angle of rotation may be −25°. That is, in the embodiment of FIG. 7, the second body 20 is mounted to the first body 10, and therefore the first angle of rotation is equal to the second angle of rotation. Accordingly, in performing rotation compensation, the HMD 100 only needs to consider any one of the first angle of rotation and the second angle of rotation.

Next, the HMD 100 may store an image performed by rotation compensation on a captured image based on the first angle of rotation and second angle of rotation. Herein, the rotation compensation represents compensation through rotating the captured image by the amount of the first angle of rotation or the second angle of rotation in the direction of the first angle of rotation or the second angle of rotation. In FIG. 7b, the first angle of rotation and the second angle of rotation are −25°. Accordingly, the rotation compensation represents compensation through rotating the captured image by 25° in the negative direction, i.e., the counter-clockwise direction. That is, since the captured image corresponds to an image rotated +25° with respect to a horizontal line, the image performed by rotation compensation corresponds to an image rotated by the captured image −25°. Thereby, the image performed by the rotation compensation corresponds to a horizontal image.

Meanwhile, the HMD 100 may display the review interface 40 which displays an image produced through the rotation compensation. Referring to FIG. 7c, when a captured image is stored, the HMD 100 may display the review interface 40 to allow the user 1 to confirm the stored image. Unlike the image shown in FIG. 6c, the stored image shown in FIG. 7c may correspond to a horizontal image.

In addition, the HMD 100 may display, on the display unit 110, an indicator 31 which indicates the first angle of rotation or second angle of rotation. As shown in FIG. 7b, the HMD 100 may display '−25°' corresponding to the first angle of rotation or second angle of rotation at the lower right end of the display unit 110. Since the first angle of rotation and the second angle of rotation are equal to each other in this embodiment, one of the angles of rotation only needs to be displayed.

Figure 8:
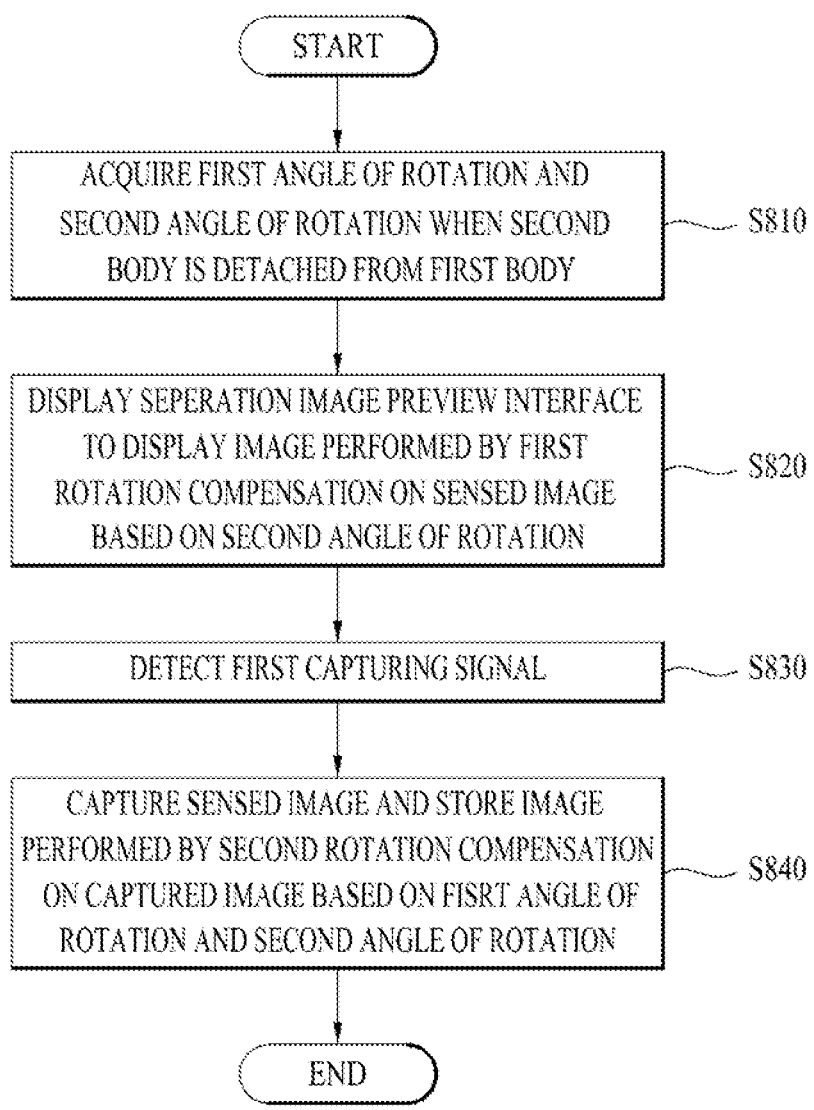
FIG. 8 is a flowchart illustrating a method of controlling the HMD of this specification.

FIG. 8 is a flowchart illustrating a method of controlling the HMD of this specification.

In the case that the second body is detached from the first body, the HMD may acquire a first angle of rotation and a second angle of rotation (S810). Herein, the HMD is assumed to be worn by the user. The first angle of rotation represents the angle of rotating the first body, and the second angle of rotation represents the angle of rotating the second body. In addition, the HMD may activate the camera interface once the second body is detached from the first body.

Next, the HMD may display the separation image preview interface to display an image performed by the first rotation compensation on a sensed image based on the second angle of rotation (S820). Herein, the first rotation compensation represents compensation through rotating the sensed image by the amount of the second angle of rotation in the rotational direction of the second angle of rotation. In addition, the first rotation compensation may include cropping the image performed by rotation compensation based on the ratio of the frame. In addition, as described above with respect to FIG. 6, the HMD may display the separation image preview interface and the detached-mode indicator simultaneously.

Next, the HMD may detect a first capturing signal (S830). As described above with respect to FIG. 6, the first capturing signal is a signal for capturing an image. For example, the first capturing signal may include a touch input to the first body or the second body and an audio input to the first body or the second body.

Next, the HMD may capture the sensed image, store an image performed by a second rotation compensation on the captured image based on the first angle of rotation and second angle of rotation (S840). Herein, the second rotation compensation represents compensation through rotating the captured image by the amount of the sum of the first angle of rotation and the second angle of rotation in the direction of the first angle of rotation or second angle of rotation. In addition, the second rotation compensation may include cropping the image performed by rotation compensation based on the ratio of the frame.

Meanwhile, the HMD may display a review interface to display an image performed by the second rotation compensation. Herein, the review interface may provide the user with the image performed by the second rotation compensation by zooming in the image.

In the case that the first body in the horizontal position, the first rotation compensation and second rotation compensation represent compensation through rotating a sensed image or captured image by the amount of the second angle of rotation in the rotational direction of the second angle of rotation. In the case that the second body is in the horizontal position, the second rotation compensation represents compensation through rotating the captured image by the amount of the second angle of rotation in the rotational direction of the second angle of rotation.

Further, while embodiments have been described with reference to each of the drawings, a new embodiment may be implemented by combining the embodiments illustrated in the drawings. In addition, designing a recording medium readable by a computer having a recorded program for implementation of the previously described embodiments, as desired by those skilled in the art is also within the scope of this specification.

The configurations and methods according to the above-described embodiments will not be applicable in a limited way to the foregoing HMD and method of controlling the same, and all or parts of the embodiments may be selectively combined and configured to make various modifications thereto.

Meanwhile, a method of controlling the HMD may be implemented on a recording medium readable by a processor provided to a network device as code readable by a processor. The recording media readable by the processor include all kinds of recording devices that store data readable by the processor. Examples of the recording media readable by the processor may include ROM, RAM, CD-ROMs, magnetic tape, floppy disks, and optical data storage devices, and may also include a device implemented in the form of a carrier wave such as, for example, transmission via the Internet. In addition, the recording media readable by the processor may be distributed in computer systems connected to each other over a network, and thus code readable by the processor may be stored and executed in a distributed manner.

As is apparent from the above description, the present invention has effects as follows.

According to one embodiment, a head-mounted display (HMD) may acquire an inclined image rather a horizontal image by performing rotation compensation on an image sensed by a camera detached from the HMD based on both the angle of rotating the detached camera and the angle of rotating the HMD.

According to another embodiment, rotation compensation is performed on a sensed image according to the angle of rotating the camera detached from the HMD, and the compensated image is displayed on an image preview interface. Accordingly, an image in a horizontal position may always be provided to a user through the image preview interface.

According to another embodiment, the HMD displays a detached-mode indicator when the camera is detached from the HMD, and displays a mounted-mode indicator when the camera is mounted to the HMD. Thereby, the user may readily recognize whether the camera is detached or mounted.

According to another embodiment, an indicator indicating the angle of rotating the HMD or the camera is displayed. Thereby, the user may readily recognize the angle of rotation.

According to another embodiment, the image preview interface and other display objects can be simultaneously displayed on the display unit. Thereby, the user is allowed to perform multiple operations simultaneously.

Although preferred embodiments have been shown and described, this specification is not limited to the above embodiments. It will be apparent to those skilled in the art that various modifications and variations can be made in this specification without departing from the spirit or scope of this specification. Thus, it is intended that the present invention covers the modifications and variations of this invention provided they come within the scope of the appended claims and their equivalents. These variations should not be individually construed from the technical spirit or prospect of this specification.

In this specification, both a product and a method have been described as the invention. Descriptions thereof are supplementarily applicable, when necessary.

What is claimed is:

1. A head-mounted display (HMD) comprising a first body and a second body,
   the first body comprises:
   a display unit configured to display visual information;
   a first angle sensing unit configured to sense a first angle of rotating the first body;
   a first communication unit configured to transmit/receive data; and
   a processor configured to control the display unit, the first angle sensing unit, and the first communication unit; and
   the second body comprises:
   a camera unit configured to sense an image;
   a second communication unit configured to transmit/receive data;
   an input sensing unit configured to detect an input signal and transmit a result of the detection to the processor; and
   a second angle sensing unit to sense a second angle of rotating the second body,
   wherein the second body is mountable to and detachable from the first body,
   wherein, when the second body is detached from the first body,
   the processor is further configured to:
   acquire the first angle of rotation and the second angle of rotation;
   display a separation image preview interface to display an image performed by a first rotation compensation on a sensed image based on the second angle of rotation;
   detect a first capturing signal; and
   capture the sensed image and store an image performed by a second rotation compensation on the captured image based on the first angle of rotation and the second angle of rotation.

2. The HMD according to claim 1, wherein the first rotation compensation represents compensation through rotating the sensed image by an amount of the second angle of rotation in a rotational direction of the second angle of rotation.

3. The HMD according to claim 2, wherein the first rotation compensation further comprises cropping the image performed by the first rotation compensation based on a ratio of a frame.

4. The HMD according to claim 1, wherein the second rotation compensation represents compensation through rotating the captured image by an amount of a sum of the first angle of rotation and the second angle of rotation in a rotational direction of the first angle of rotation or the second angle of rotation.

5. The HMD according to claim 4, wherein the second rotation compensation further comprises cropping the image performed by the second rotation compensation based on a ratio of a frame.

6. The HMD according to claim 1, wherein, when the first body is in a horizontal position, the first rotation compensation and the second rotation compensation represent compensation through rotating the sensed image or the captured image by an amount of the second angle of rotation in a rotational direction of the second angle of rotation.

7. The HMD according to claim 1, wherein, when the second body is in a horizontal position, the second rotation compensation represents compensation through rotating the captured image by an amount of the second angle of rotation in a rotational direction of the second angle of rotation.

8. The HMD according to claim 1, wherein the processor is further configured to display the separation image preview interface and a separated-mode indicator simultaneously.

9. The HMD according to claim 1, wherein, when the second body is detached from the first body, the processor is further configured to activate a camera interface.

10. The HMD according to claim 1, wherein, when the second body is mounted to the first body, the processor is further configured to provide a mounting image preview interface to display the sensed image.

11. The HMD according to claim 10, wherein, when the second body is mounted to the first body, the processor is further configured to acquire at least one of the first angle of rotation and the second angle of rotation.

12. The HMD according to claim 11, wherein the processor is further configured to:
detect a second capturing signal,
capture the sensed image and acquire the first angle of rotation and the second angle of rotation, based on the detected second capturing signal, and
store an image performed by rotation compensation on the captured image based on the first angle of rotation or the second angle of rotation.

13. The HMD according to claim 11, wherein the processor is further configured to display the mounting image preview interface and a mounted-mode indicator simultaneously.

14. The HMD according to claim 1, wherein the processor is further configured to display an indicator indicating at least one of the first angle of rotation and the second angle of rotation.

15. The HMD according to claim 1, wherein the processor is further configured to display a review interface to display the image performed by the second rotation compensation.

16. The HMD according to claim 1, the review interface displays the image performed by the second rotation compensation by zooming in the image.

17. The HMD according to claim 1, wherein the HMD is worn by a user.

18. The HMD according to claim 1, wherein the separation image preview interface is displayed on one of upper, lower, left and right sides of the display unit.

19. The HMD according to claim 1, wherein the processor is further configured to display the separation image preview interface and at least one display object on the display unit simultaneously.

20. A method of controlling a head-mounted display including a first body and a second body, the second body including a camera to sense an image, the method comprising, in the case that the second body is detached from the first body, the method comprising:
acquiring a first angle of rotating the first body and a second angle of rotating the second body;
displaying a separation image preview interface to display an image performed by a first rotation compensation on the sensed image according to the second angle of rotation;
detecting a first capturing signal; and
capturing the sensed image and storing an image performed by a second rotation compensation on the captured image according to the first angle of rotation and the second angle of rotation.

* * * * *